(12) United States Patent
Zielinski et al.

(10) Patent No.: US 9,896,620 B2
(45) Date of Patent: Feb. 20, 2018

(54) PROPPANT SAND COATING FOR DUST REDUCTION

(71) Applicant: Covestro LLC, Pittsburgh, PA (US)

(72) Inventors: David P. Zielinski, Wexford, PA (US);
Emery Yuhas, Greensburg, PA (US);
Yanan Chen, Pittsburgh, PA (US);
Derick Henderson, Crafton, PA (US);
Mark Connor, Coraopolis, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 15/047,108

(22) Filed: Feb. 18, 2016

(65) Prior Publication Data

US 2016/0257876 A1 Sep. 8, 2016

Related U.S. Application Data

(60) Provisional application No. 62/128,085, filed on Mar. 4, 2015.

(51) Int. Cl.
*C09K 8/80* (2006.01)
*B05D 7/00* (2006.01)
*E21B 43/267* (2006.01)

(52) U.S. Cl.
CPC ............. *C09K 8/805* (2013.01); *B05D 7/00* (2013.01); *E21B 43/267* (2013.01)

(58) Field of Classification Search
None
See application file for complete search history.

(56) References Cited

U.S. PATENT DOCUMENTS

| | | |
|---|---|---|
| 5,075,370 A | 12/1991 | Kubitza et al. |
| 5,252,696 A | 10/1993 | Laas et al. |
| 5,304,400 A | 4/1994 | Dhein et al. |
| 5,750,613 A | 5/1998 | Blum et al. |
| 5,837,656 A | 11/1998 | Sinclair et al. |
| 6,426,414 B1 | 7/2002 | Laas et al. |
| 6,582,819 B2 | 6/2003 | McDaniel et al. |
| 6,632,527 B1 | 10/2003 | McDaniel et al. |
| 6,767,958 B2 | 7/2004 | Laas et al. |
| 7,153,575 B2 | 12/2006 | Anderson et al. |
| 7,205,356 B2 | 4/2007 | Guertler et al. |
| 7,270,879 B2 | 9/2007 | McCrary |
| 7,426,961 B2 | 9/2008 | Stephenson et al. |

(Continued)

FOREIGN PATENT DOCUMENTS

WO 0162819 A1 8/2001

OTHER PUBLICATIONS

DustPRO, A Preferred Technology Product Technical Sheet, Preventative Technology Solves for Silica Exposure Throughout the Product Lifecycle, Radnor, PA 19087, USA; Published; Sep. 10, 2014.

(Continued)

*Primary Examiner* — Jeffrey Washville
(74) *Attorney, Agent, or Firm* — John E. Mrozinski, Jr.

(57) ABSTRACT

The present invention provides for coating proppants, such as sand, with a resin-containing dispersion which dramatically reduces the dust generated during handling, for example in hydraulic fracturing, by protecting the surface of the particle from abrasion and degradation. Such resin-containing dispersion coated-sand may also reduce the wear on metal parts used in transporting such proppants.

15 Claims, 7 Drawing Sheets

(56) References Cited

U.S. PATENT DOCUMENTS

| | | | |
|---|---|---|---|
| 7,624,802 B2 | 12/2009 | McCrary et al. | |
| 7,713,918 B2 | 5/2010 | Stephenson | |
| 8,133,587 B2 | 3/2012 | Rediger et al. | |
| 8,763,700 B2 | 7/2014 | McDaniel et al. | |
| 2006/0035790 A1 | 2/2006 | Okell et al. | |
| 2012/0279703 A1 | 11/2012 | McDaniel et al. | |
| 2013/0056204 A1 | 3/2013 | McDaniel et al. | |
| 2013/0065800 A1* | 3/2013 | McDaniel | C09K 8/805 507/219 |
| 2013/0186624 A1 | 7/2013 | McCrary et al. | |
| 2014/0110111 A1 | 4/2014 | Tanguay et al. | |
| 2014/0274819 A1 | 9/2014 | McCrary et al. | |
| 2014/0309149 A1 | 10/2014 | McDaniel et al. | |
| 2014/0338906 A1 | 11/2014 | Monestiriotis et al. | |
| 2015/0034314 A1* | 2/2015 | Hudson | C09K 8/805 166/276 |
| 2015/0119301 A1* | 4/2015 | McDaniel | C09K 8/805 507/224 |
| 2015/0252252 A1 | 9/2015 | Soane et al. | |
| 2015/0275071 A1* | 10/2015 | Chen | C09K 8/805 507/263 |
| 2015/0360188 A1 | 12/2015 | Green | |
| 2015/0361331 A1 | 12/2015 | Tanguay et al. | |
| 2016/0032178 A1 | 2/2016 | Fitzgerald et al. | |
| 2016/0215208 A1* | 7/2016 | Monastiriotis | C09K 8/80 |

OTHER PUBLICATIONS

American Foundrymen's Society Procedure 227-87-S. "Moldablility of Molding Sand Mixtures" Mold & Core Test Handbook, 2nd edition (1989).

\* cited by examiner

PROPPANT SAND COATING FOR DUST REDUCTION

CROSS REFERENCE TO RELATED APPLICATION

This application claims the benefit, under 35 USC § 119(e), of U.S. provisional patent application No. 62/128,085, filed Mar. 4, 2015, entitled "PROPPANT SAND COATING FOR DUST REDUCTION" the entire disclosure of which is hereby incorporated by reference.

FIELD OF THE INVENTION

The present invention relates, in general, to oil and gas drilling and, more specifically, to proppant sand coatings with resin-containing dispersions to reduce dust.

BACKGROUND OF THE INVENTION

Coating of hydraulic fracturing (or fracking) sand is not new. Millions of tons of sand or proppant are used in the oil and gas industry every year to stimulate wells and thereby improve productivity. Such sand may be coated to impart specialized functionality when in use in the down-hole environment. The sand "props open" the fractures in the well so that fluids and gas can escape more efficiently. The typical sand coating is either heat or chemically activated so that the sand will "stick" to itself forming a discrete "pack" or sponge like formation with open pathways for the fluid and gas to escape. Once the well is depleted, the sand pack can be "broken" or dissolved so the sand can flow back out of the well and be recovered. Uncoated sand is however, the largest percentage of fracking sand used in the industry.

Uncoated sand can fracture during handling operations creating very fine particles or dust. This dust is primarily composed of crystalline silica which is a known carcinogen. The handling of sand from mining, transport and handling can create large amounts of dust containing crystalline silica, which can be toxic at low inhalation levels. Reducing the risk to persons involved in handling hydraulic fracturing sand is a responsible and sustainable goal.

A number of references in the art are directed to coating hydraulic fracturing sand with a variety of materials, such as the use of thermoplastic coatings.

U.S. Pat. No. 6,582,819, issued to McDaniel et al., provides low density composite particles made of a binder and filler material for use in subterranean formations. The filler includes low density filler and optionally other filler. The binder includes a polymer and optionally cement. The binder is said to be at least one member of the group consisting of epoxy resin, polyurethane resin, alkaline modified phenolic resole curable with ester, melamine resin, urea-aldehyde resin, urea-phenol-aldehyde resin, furans, synthetic rubber, polyester resin, and further comprises cross-linking agents and conventional additives. The particles are said to be useful as proppants to prop open subterranean formation fractures. The particles are also said to be useful for gravel packing in subterranean formations, water filtration and artificial turf for sports fields. Methods of making the composite particles are also disclosed.

McDaniel et al., in U.S. Pat. No. 6,632,527, disclose composite particles made of a binder and filler material for use in subterranean formations. The filler is finely divided mineral and optional fiber. The binder is said to be at least one member of the group consisting of inorganic binder, epoxy resin, novolak resin, resole resin, polyurethane resin, alkaline phenolic resole curable with ester, melamine resin, urea-aldehyde resin, urea-phenol-aldehyde resin, furans, synthetic rubber, polyester resin, and further comprises cross-linking agents and conventional additives. The particles are proppants said to be useful to prop open subterranean formation fractures. The particles are also useful for water filtration and artificial turf for sports fields. Methods of making the composite particles are also disclosed.

U.S. Pat. No. 7,153,575, issued to Anderson et al., teaches coated particulate matter wherein the particles are individually coated with a first set of one or more layers of a curable resin, for example, a combination of phenolic/furan resin or furan resin or phenolic-furan-formaldehyde terpolymer, on a proppant such as sand, and the first set of layers is coated with a second set of one or more layers of a curable resin, for example, a novolak resin with curative. Methods for making and using this coated product as a proppant, gravel pack and for sand control are also disclosed.

McCrary et al., in U.S. Pat. No. 7,624,802, teach free flowing coated particles and low temperature methods of making the same. Each particle has a curable coating disposed upon a substrate. The substrate is a particulate substrate including an inorganic material, a particulate substrate including an organic material, a composite substantially homogeneous formed particle including a first portion of an at least partly cured binder and filler particles, or a hybrid particle having an inorganic particle as a core and a composite coating including at least partially cured resin and filler. The curable coating includes a continuous phase including resole resin and reactive powder particles embedded or adhered to the continuous phase. The reactive powder particles typically include resole resin, novolak resin, polyester, acrylic and/or urethane. A method including applying a coating including the continuous phase including resole resin and reactive or non-reactive powder particles embedded or adhered to the continuous phase.

U.S. Pat. No. 8,133,587, issued to Rediger et al., discloses thermoplastic coated proppants and methods for preparing the thermoplastic coated proppants. Methods for using these proppants in subterranean well formations and hydraulic fracturing operations, for example, are also disclosed. The thermoplastics are selected from a polyethylene, a polypropylene, an ethylene vinyl acetate, an ethylene ethyl acrylate, a styrene-isoprene-styrene, an acrylonitrile-butadiene-styrene, a styrene-butadiene-styrene, a polystyrene, a polyurethane, an acrylic polymer, a polyvinyl chloride, a fluoroplastic, a pine rosin (e.g., tall oil rosin, wood rosin, and gum rosin), a modified rosin (e.g., disproportionated rosins, hydrogenated rosins, polymerized or oligomerized rosins, Diels-Alder rosin adducts), a rosin ester (e.g., hydrogenated rosin esters, polymerized rosin esters, phenolic-modified rosin esters, dibasic acid-modified rosin esters; the rosin esters can be derived from tall oil rosin, wood rosin, and/or gum rosin), a polysulfide, a styrene-acrylonitrile, a nylon, a phenol-formaldehyde novolak resin, or a combination thereof.

U.S. Pat. No. 8,763,700, issued to McDaniel et al., discloses proppants for use in fractured or gravel packed/frac packed oil and gas wells with a contaminant removal component to remove one or more of the contaminants found in subterranean water/hydrocarbon from a production well. The water/hydrocarbon cleaning proppant solids may be used as discrete particles in a proppant formulation, as a coating on proppant solids in pores of a porous proppant solid or as part of the proppant's internal structure. The contaminant removal component removes contaminants, especially dissolved contaminants, in the subterranean water or hydrocarbon before the water/hydrocarbon leaves the well. For those contaminant removal components that can be regenerated, such as ion exchange resins, a measured quantity of an acidic regeneration solution can be injected into the fractured stratum for regeneration and recovered when the well resumes production.

U.S. Published Patent Application No. 2013/0065800, in the of McDaniel et al., discloses solid proppants coated with a coating that exhibits the handling characteristics of a pre-cured coating while also exhibiting the ability to form particle-to-particle bonds at the elevated temperatures and pressures within a wellbore. The coating includes a substantially homogeneous mixture of (i) at least one isocyanate component having at least 2 isocyanate groups, and (ii) a curing agent comprising a monofunctional alcohol, amine or amide. The coating process can be performed with short cycle times, e.g., less than about 4 min., and still produce a dry, free-flowing, coated proppant that exhibits low dust characteristics during pneumatic handling but also proppant consolidation down-hole for reduced washout and good conductivity. Such proppants are said to form good unconfined compressive strength without use of an bond activator, are substantially unaffected in bond formation characteristics under down-hole conditions despite prior heat exposure, and are said to be resistant to leaching with hot water.

McCrary et al., in U.S. Published Patent Application No. 2013/0186624, discuss solid proppants coated in a process that includes the steps of: (a) coating free-flowing proppant solids with a first component of either a polyol or an isocyanate in mixer; (b) adding a second component of either an isocyanate or a polyol that is different from the first component at a controlled rate or volume sufficient to form a polyurethane coating on the proppant solids; and (c) adding water at a rate and volume sufficient to retain the free-flowing characteristics of the proppant solids.

U.S. Published Patent Application No. 2014/0274819, in the name of McCrary et al., discloses proppants for hydraulic fracturing of oil and gas wells coated with a polyurea-type coating. In a preferred embodiment, the polyurea-type coating is formed by contacting a polymeric isocyanate with an amount of water and a blowing catalyst at a rate and quantity sufficient to generate a reactive amine in situ on the outer surface of the proppant which thereby reacts with unconverted polymeric isocyanate to form a thin polyurea-type surface coating that is substantially solid and lacks foam or substantial porosity. Alternatively, the polyurea-type can be produced by selecting reactive amine compounds and isocyanates to develop the coated proppant. The coated proppants retain the discrete, free-flowing character of the original core solids but with the beneficial effects of the polyurea-type coating of the present invention.

McDaniel et al., in U.S. Published Patent Application No. 2014/0309149, provide proppants for use in fractured or gravel packed/frac packed oil and gas wells with a contaminant removal component to remove one or more of the contaminants found in subterranean water/hydrocarbon from a production well. The water/hydrocarbon cleaning proppant solids may be used as discrete particles in a proppant formulation, as a coating on proppant solids in pores of a porous proppant solid or as part of the proppant's internal structure. The contaminant removal component removes contaminants, especially dissolved contaminants, in the subterranean water or hydrocarbon before the water/hydrocarbon leaves the well. For those contaminant removal components that can be regenerated, such as ion exchange resins, a measured quantity of an acidic regeneration solution can be injected into the fractured stratum for regeneration and recovered when the well resumes production.

U.S. Published Patent Application No. 2014/0338906, in the name of Monastiriotis et al., discloses polymer-coated proppants for hydraulic fracturing of oil and gas wells have an outer layer portion that comprises an organofunctional coupling agent, preferably an organofunctional silane coupling agent. The use of an organofunctional silane coupling agent in the outer layer portion of the proppant coating is preferably chosen to expose functionalities that will be reactive towards similar functionalities of adjacent and similarly coated proppants so that, when introduced down-hole, these proppants form interparticle bonds at the temperatures and crack closure pressures found down-hole in fractured strata. Such enhanced interparticle bonding helps keep the proppant in the fracture and maintains conductivity with reduced flow-back. The invention also helps proppants designed for low temperature well to bond more firmly and allows proppants designed for high temperature wells to bond well even at lower down-hole temperatures, thereby extending their useful range.

Hudson et al., in U.S. Published Patent Application No. 2015/0034314 describe coated particles, such as proppants, processes for their preparation and methods for using such particles, such as in a hydraulic fracturing process. The coated particles are said to include a coating that includes a crystalline or semicrystalline polyester/polyurethane having a decrystallization temperature of at least 35° C. Hudson et al. make no mention of reducing dust on their proppants.

A need continues to exist in the art for a way to reduce or eliminate dust generated during sand handling for hydraulic fracturing operations.

SUMMARY OF THE INVENTION

Accordingly, the present invention helps dramatically reduce dust generated during particle handling, for example in hydraulic fracturing, by coating particles with a resin-containing dispersion. This coating protects the surface of the proppant from abrasion and degradation. Such resin-containing dispersion coated-particles may also reduce the wear on metal parts used in transporting the sand.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein:

FIG. 1 shows neat resin-fresh samples of the candidate resin-containing dispersions;

FIG. 2 shows neat resin-dry samples of the candidate resin-containing dispersions;

FIG. 3 shows neat resin+1% Surfactant, freshly applied samples of the candidate resin-containing dispersions;

FIG. 4 shows neat resin+1% Surfactant, dried samples of the candidate resin-containing dispersions;

DETAILED DESCRIPTION OF THE INVENTION

Figure 1:
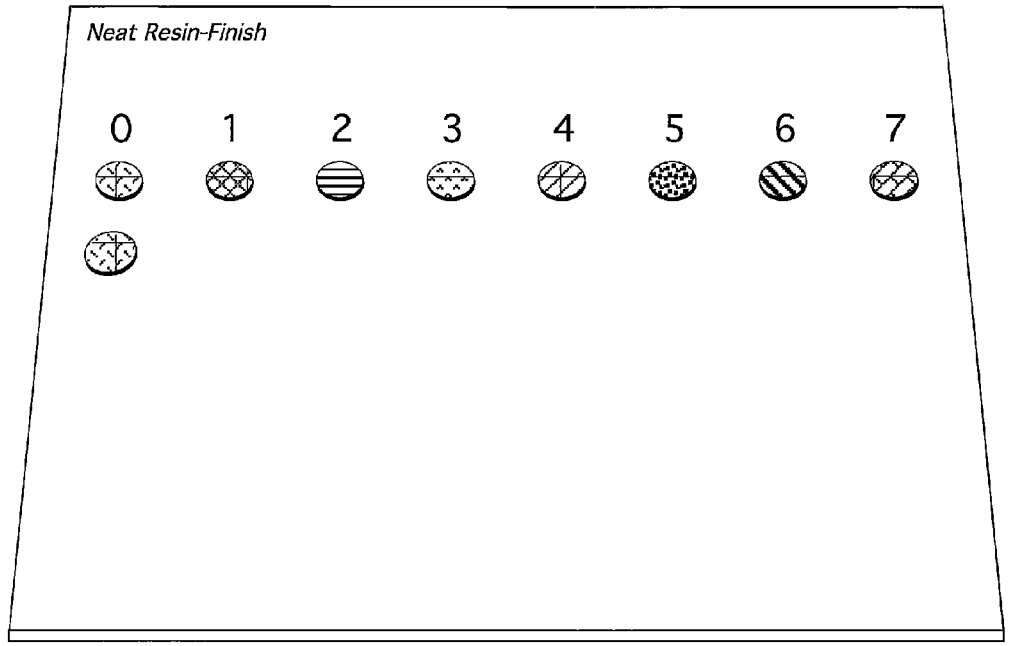
FIGS. 1-4 illustrate a pre-screening of candidate resin-containing dispersions on a hot glass plate.
Figure 2:
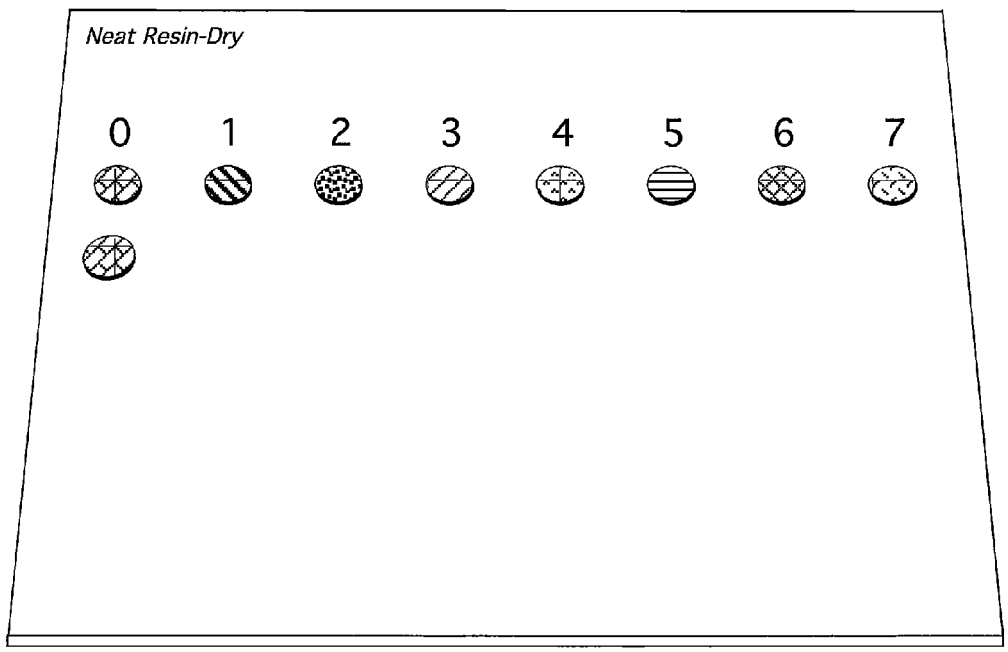
Figure 3:
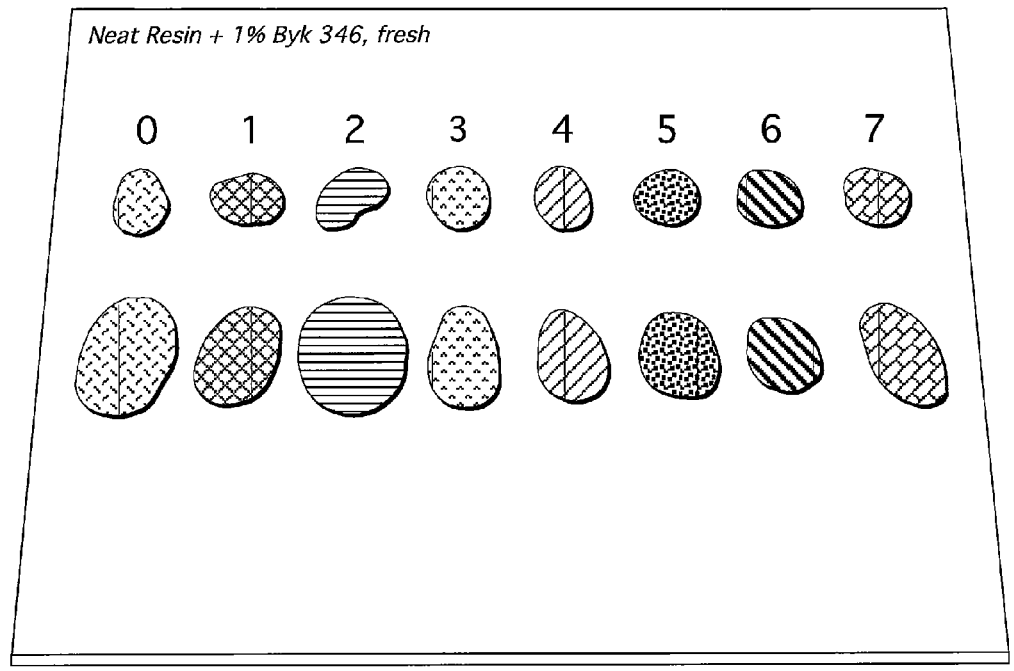
Figure 4:
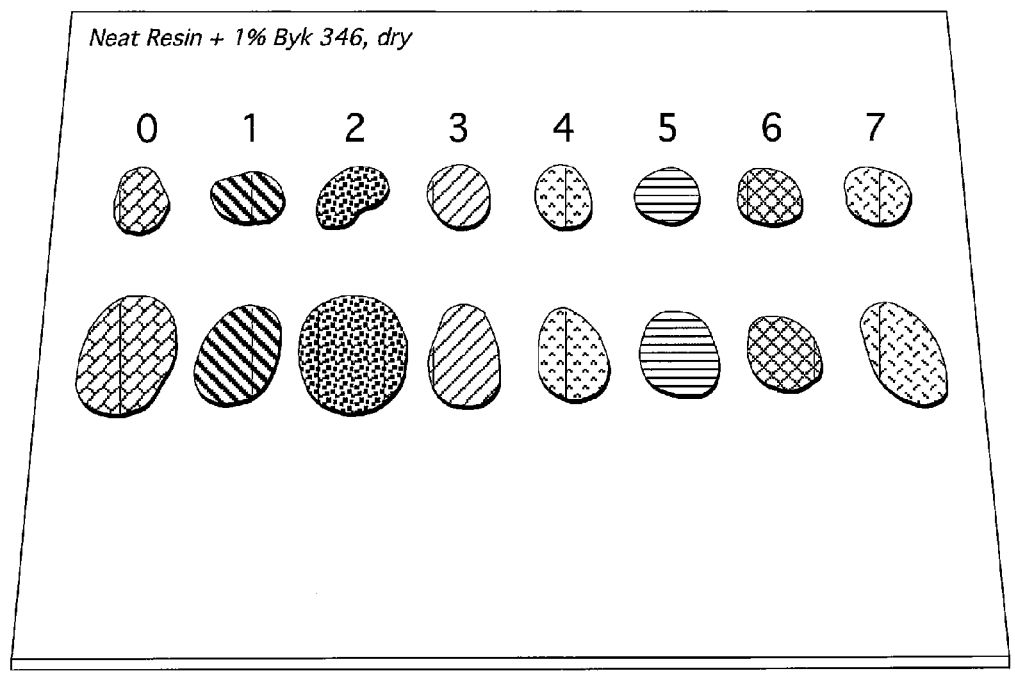

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicants reserve the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a).

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual resin-containing dispersion coating, or any members of a claimed group, if for any reason Applicants choose to claim less than the full measure of the disclosure, for example, to account for a reference that Applicants may be unaware of at the time of the filing of the application.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicants reserve the right to amend this specification to expressly recite any subject matter, or portion thereof, incorporated by reference herein.

Reference throughout this specification to "various non-limiting embodiments", "certain embodiments", or the like, means that a particular feature or characteristic may be included in an embodiment. Thus, use of the phrase "in various non-limiting embodiments", "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The present invention is directed generally to resin-containing dispersion-coated proppants, methods for preparing the dispersion-coated proppants, and methods for using these proppants in, for example, subterranean well formations and hydraulic fracturing operations. Resin-containing dispersion-coated proppants of the present invention produce significantly less dust during handling and transport operations. This improves the ease in handling the proppants prior to and during their use. For example, these coated proppants do not need to be transported to a well site in slurry or suspension form, but can be distributed in bulk quantities as free-flowing solids.

To define more clearly the terms and concepts disclosed herein, the following definitions are provided. To the extent that any definition or usage provided by any document incorporated herein by reference conflicts with the definition or usage provided herein, the definition or usage provided herein controls.

The terms "particle", "particulate", "particulate material" and the like, when unmodified, are used herein to indicate the base material which, when coated, forms a "proppant." For example, hydraulic fracturing (fracking) sand is a material that is often referred to in the art as a "proppant", but in this disclosure, it is referred to as a "particle." The terms "proppant", "proppant particle", "coated proppant", and the like, are reserved for resin-containing dispersion-coated particles in accordance with the teachings of this invention.

The term "free-flowing" is used herein to mean that the proppant particles do not agglomerate appreciably, and generally remain as discrete, individual proppant particles. Proppants of the present invention are "free-flowing" at ambient conditions, i.e., at a temperature of about 20-25° C.

and at atmospheric pressure. The flowability of the solid particles can be measured using a test method such as the American Foundrymen's Society Procedure 227-87-S, entitled "Moldability of Molding Sand Mixtures" as found in the Mold & Core Test Handbook, 2nd edition (1989), which is incorporated herein by reference. Briefly, the test procedure involves placing a 200 g sample of solid particles in a cylindrical 8-mesh screen of a rotary screen device driven by a 57 rpm motor. The screen was rotated for 10 sec. In accordance with this test, the moldability index is equal to the weight of the product passing through the screen divided by the original weight charged to the screen chamber (i.e., 200 g). If all of the material passes through the screen, the moldability index is 100%. In accordance with the present invention, free-flowing proppants have a moldability index of greater than about 80% at ambient conditions. For instance, the proppants disclosed herein can have a moldability index greater than about 85%, or greater than about 90%. In some aspects of this invention, the coated proppants have a moldability index of greater than about 95%, or alternatively, greater than about 98%. Generally, solid materials that are not free-flowing have a moldability index of less than about 50%. Such materials can, in some cases, have a moldability index of less than about 40%, or less than about 25%.

Although any methods, devices, and materials similar or equivalent to those described herein can be used in the practice or testing of the invention, the typical methods, devices and materials are herein described.

Although compositions and methods are described in terms of "comprising" various components or steps, the compositions and methods can also "consist essentially of" or "consist of" the various components or steps.

The present invention is directed to resin-containing dispersion-coated proppants, methods for preparing the coated proppants, and methods for using these proppant particles in subterranean well formations and hydraulic fracturing operations, for example. A coated proppant in accordance with one aspect of the present invention comprises (i) a particle, and (ii) a resin-containing dispersion-coating on the particle.

The coated particles of certain embodiments of the present invention can be prepared by any of a variety of processes, including batch, semi-continuous, or continuous processes. Batch, continuous mixers or in-line where the sand is effectively agitated sufficient to spread coating onto the sand surface may be used to prepare the coated particles of some embodiments of the invention. Suitable methods of coating the particles include, but are not limited to, spraying, slurrying, flooding, and simply adding solution to bulk proppant and stirring. Application temperatures may be from about 4.4° C. (40° F.)—the coating solution must be flowable but protected from freezing—up to as high as approximately 232.22° C. (450° F.). At temperatures above 100° C. (212° F.), i.e., the boiling point of water, the required contact time of the solution should be limited due to the rapid evolution of water from the mixture. At lower application temperatures, the coated sand mixture requires longer drying times or the addition of heat to speed the drying process.

In a sand processing plant, there are several application points including a wash step, drying step, during other transport processes or in-line or off-line with an additional mixing step where the present invention may find applicability. A separate coating process of the sand may occur at an off-site location. In the case of coating done separately from the sand manufacturing, any of several batch or continuous coating methods may be employed, including those used to prepare resin-coated proppant designed for flowback control, for example. Large scale mixers from Robert Sintos (sold by DelSol Industrial Services) and WEBAC Corp. may be used. Both companies provide resin coating plant design that may be used in some embodiments of the invention. In one aspect of the invention, the most preferred location for coating is at the site of the sand processing, either in-line with the sand processing flow or nearby so as to minimize the handling and transport of large quantities of sand and adding additional cost. Suitable process equipment for coating the sand includes, but is not limited to, twin screw mixers, fluidized beds, modified single screw mixers, batch tanks with mixing blades, and single or multiple head sprayers.

The present invention is not limited to any specific type of particulate material for use as the proppant substrate (before providing the particle or particulate with the coating containing a resin-containing dispersion material in accordance with the present invention), so long as the particle has sufficient strength to withstand the stresses, such as elevated temperature and pressure, often encountered in oil and gas recovery applications. In one aspect of the present invention, the particle of the coated proppant is a sand, a naturally occurring mineral fiber, a ceramic, a bauxite, a glass, a metal bead, a walnut hull, a composite particle, and the like. For instance, the sand can be graded sand or a resin-coated sand. Such resin-coated sands include sand particles coated with a curable thermosetting resin, for example, as described in U.S. Pat. No. 5,837,656, the disclosure of which is incorporated herein by reference in its entirety. These resin-coated sands can serve as particles in the present invention. A ceramic can include both porous and non-porous ceramic materials, while a bauxite can include sintered bauxite materials. Composite particles are an agglomeration of smaller, fine particles held together by a binder, and such composite particles can be the particulate material in the present invention. Compositions containing coated proppants can employ mixtures or combinations of more than one type of particle, for instance, both a sand and a ceramic can be coated and then mixed to form a composition of coated proppants. It is contemplated that any particulate material suitable for use in proppant applications can be used in the present invention, regardless of the specific gravity of the particle, although it can be beneficial in certain applications to have a lower specific gravity to increase the distance that the proppants can be carried into a formation prior to settling.

In another aspect, the particle is either a porous ceramic or porous polymer particle. Such particles are described in, for example, U.S. Pat. Nos. 7,426,961 and 7,713,918, the disclosures of which are incorporated herein by reference in their entirety. These porous ceramic or porous polymer materials can be of natural origin or can be produced synthetically. Although the use of such materials is not limited by specific gravity, the specific gravity of these materials is generally less than about 3 g/cc, or less than about 2.7 g/cc. In another aspect, the specific gravity of the porous particle is less than about 2.5 g/cc, for example, less than about 2.2 g/cc.

The particle size of the particle used to produce the coated proppant of the present invention generally falls within a range from about 100 μm to about 3000 μm (about 3 mm) In another aspect, the particle size is from about 125 μm to about 2500 μm, from about 150 μm to about 2000 μm, or from about 175 μm to about 1500 μm. Yet, in another aspect, the particle of the coated proppant of the present invention has a particle size that falls within a narrower range of about 200 µm to about 1000 µm, for example, about 250 µm to about 800 µm, or from about 300 µm to about 700 µm.

In another aspect of this invention, the particles generally have a mesh size from about 8 and about 100, based on the U.S. Standard Sieve Series. For example, in a distribution of such particles which can be added to a treating fluid for use in a subterranean formation, at least about 90% by weight of the particles have a particle size falling within the range from about 8 to about 100 mesh. In accordance with another aspect of the present invention, at least about 95% by weight of the particles in a resin-containing dispersion-coated proppant composition have a size within the range from about 8 to about 100 mesh. Further, 90% by weight or more (e.g., 95% or more) of the particles in a resin-containing dispersion-coated proppant composition can have a size within the 20 to 40 mesh range in another aspect of this invention.

In a different aspect, the particle in the resin-containing dispersion-coated proppant has a size in the range from about 8 to about 140 mesh, from 10 to about 120 mesh, from about 10 to about 100 mesh, or from about 14 to about 80 mesh. In other aspects of this invention, the particle is in a range from about 18 to about 60 mesh, or from about 20 mesh to about 40 mesh. In another aspect, there is less than about 10% by weight, for example, 5% by weight of less, of particles in a coated proppant composition having a size of less than about 20 mesh or greater than about 50 mesh.

The proppants of the present invention generally comprise particles which are not limited to any particular material or size.

The coated particles described herein can be used in a variety of applications including, for example, use as a component of a coating, adhesive, or sealant composition, in which the coated particles are dispersed in a binder resin, such as any binder resin known to those skilled in the art of such compositions.

In certain embodiments, however, the coated particles of the present invention are thought to be particularly suitable for use in hydraulic fracturing a geologic formation. In these embodiments, the coated particles may be combined with a carrier fluid, such as water and/or a hydrocarbon, and the mixture injected at elevated pressure into a well bore to an underground geologic formation. When the pressure in the formation resulting from the injection exceeds the strength of the formation, a fracture is formed and the coated particles, i.e., proppant, are placed in the formation in an effort to maintain the fracture in a propped position when the injection pressure is released. Upon ceasing the injection of fluid, it is desired that the proppant forms a pack that serves to hold open the fractures, thereby providing a highly conductive channel through which a desired material, such as water, oil, or gas (including natural gas) can flow to the well bore for retrieval.

In certain embodiments, therefore, the coated particles are used in a method of forming a proppant composition that includes suspending the coated particles described herein in a carrier fluid to form a suspension and injecting the suspension into an underground geologic formation.

The coated particles described herein can be injected as the sole proppant or as a partial replacement for an existing proppant. For example, if desired, the coated particles described herein may comprises 1 to 99 percent by weight, such as 10 to 90 percent by weight, or, in some cases, 10 to 50 percent by weight, based on the total weight of the proppant present in the composition that is injected into the well bore. In some embodiments, an uncoated proppant is first placed in a well, and thereafter a proppant of the coated particles described herein is placed in the fracture nearest to the wellbore or fracture openings.

The coated particles of the present invention are presently thought to provide several advantages, particularly in the context of hydraulic fracturing. For example, the coated particles tend to drastically reduce the abrasion and degradation of the particles and therefore greatly reduce the formation of dust from the particles. Such resin-containing dispersion coated-particles may also reduce the wear on metal parts used in transporting the particles.

As used herein, the term "coating" refers to a set of chemical components that may be mixed to form an active coating composition that may be applied and cured to form a coating. As used herein, the term "coating composition" refers to a mixture of chemical components that will dry by eliminating water and/or co-solvent. Accordingly, a coating composition may be formed from a coating system by mixing the chemical components comprising the coating system. Furthermore, when a list of constituents is provided herein that are individually suitable for forming the components of the coating system or coating composition discussed herein, it should be understood that various combinations of two or more of those constituents, combined in a manner that would be known to those of ordinary skill in the art reading the present specification, may be employed and is contemplated.

As used herein, the term "polyurethane" refers to polymeric or oligomeric materials comprising urethane groups, urea groups, or both. Accordingly, as used herein, the term "polyurethane" is synonymous with the terms polyurea, polyurethane/urea), and modifications thereof. The term "polyurethane" also refers to crosslinked polymer networks in which the crosslinks comprise urethane and/or urea linkages, and/or the constituent polymer chains comprise urethane and/or urea linkages. Carbodiimide crosslinking as is known to those skilled in the art is also contemplated in the coated proppants of the invention.

As used herein, the term "dispersion" refers to a composition comprising a discontinuous phase distributed throughout a continuous phase. For example, "waterborne dispersion" and "aqueous dispersion" refer to compositions comprising particles or solutes distributed throughout liquid water. Waterborne dispersions and aqueous dispersions may also include one or more co-solvents in addition to the particles or solutes and water. As used herein, the term "dispersion" includes, for example, colloids, emulsions, suspensions, sols, solutions (i.e., molecular or ionic dispersions), and the like. The resin-containing dispersion in the present invention may be applied at about 0.05 wt. % to about 2.0 wt. % resin solids based on the weight of the proppant.

As used herein, the term "polyisocyanate" refers to compounds comprising at least two free isocyanate groups. Polyisocyanates include diisocyanates and diisocyanate reaction products comprising, for example, biuret, isocyanurate, uretdione, urethane, urea, iminooxadiazine dione, oxadiazine trione, carbodiimide, acyl urea, and/or allophanate groups. As used herein, the term "polyol" refers to compounds comprising at least two free hydroxy groups. Polyols include polymers comprising pendant and/or terminal hydroxy groups. As used herein, the term "polyamine" refers to compounds comprising at least two free amine groups. Polyamines include polymer comprising pendant and/or terminal amine groups.

Water-dispersible polyisocyanates include polyisocyanates that may form an aqueous dispersion with the aid of organic co-solvents, protective colloids, and/or external emulsifiers under high shear conditions. Water-dispersible polyisocyanates also include polyisocyanates that are hydrophilically-modified with covalently linked internal emulsifiers.

The polyisocyanate may comprise any organic polyisocyanates having aliphatically, cycloaliphatically, araliphatically, and/or aromatically bound free isocyanate groups, which are liquid at room temperature or are dispersed in a solvent or solvent mixture at room temperature. In various embodiments, the polyisocyanate may have a viscosity of from 10-15000 mPas at 23° C., 10-5000 mPas at 23° C., or 50-1000 mPas at 23° C. In various embodiments, the polyisocyanate may comprise polyisocyanates or polyisocyanate mixtures having exclusively aliphatically and/or cycloaliphatically bound isocyanate groups with an (average) NCO functionality of 2.0-5.0 and a viscosity of from 10-5000 mPas at 23° C., 50-1000 mPas at 23° C., or 100-1000 mPas at 23° C.

In various embodiments, the polyisocyanate may comprise polyisocyanates or polyisocyanate mixtures based on one or more aliphatic or cycloaliphatic diisocyanates, such as, for example, ethylene diisocyanate; 1,4-tetramethylene diisocyanate; 1,6-hexamethylene diisocyanate (HDI); 2,2,4-trimethyl-1,6-hexamethylene diisocyanate; 1,12-dodecamethylene diisocyanate; 1-isocyanato-3-isocyanatomethyl-3,5,5-trimethyl-cyclohexane (isophorone diisocyanate or IPDI); bis-(4-isocyanatocyclohexyl)methane ($H_{12}MDI$); cyclohexane 1,4-diisocyanate; bis-(4-isocyanato-3-methylcyclohexyl)methane; PDI (pentane diisocyanate—biobased) isomers of any thereof; or combinations of any thereof. In various embodiments, the polyisocyanate component may comprise polyisocyanates or polyisocyanate mixtures based on one or more aromatic diisocyanates, such as, for example, benzene diisocyanate; toluene diisocyanate (TDI); diphenylmethane diisocyanate (MDI); isomers of any thereof; or combinations of any thereof. In various embodiments, the polyisocyanate component may comprise a triisocyanate, such as, for example, 4-isocyanatomethyl-1,8-octane diisocyanate (triisocyanatononane or TIN); isomers thereof; or derivatives thereof.

Additional polyisocyanates (including various diisocyanates) that may also find utility in the polyurethane coating useful in the present invention may include the polyisocyanates described in U.S. Pat. Nos. 5,075,370; 5,304,400; 5,252,696; 5,750,613; and 7,205,356, each of which is incorporated by reference herein. Combinations of any of the above-identified and incorporated polyisocyanates may also be used to form a polyurethane dispersion useful herein.

The di- and tri-isocyanates indicated may be used as such, or as derivative polyisocyanates comprising biuret, isocyanurate, uretdione, urethane, urea, iminooxadiazine dione, oxadiazine trione, carbodiimide, acyl urea, and/or allophanate groups. In various embodiments, derivative polyisocyanates comprising biuret, isocyanurate, uretdione, urethane, iminooxadiazine dione, oxadiazine trione, carbodiimide, acyl urea, and/or allophanate groups are included in the polyisocyanate coating. In various embodiments, the polyisocyanate component comprises one or more of the above-identified structural groups prepared from IPDI, HDI, $H_{12}MDI$, and/or cyclohexane 1,4-diisocyanate.

The polyisocyanate may be hydrophilically-modified to be water-dispersible. Hydrophilically-modified water-dispersible polyisocyanates are obtainable, for example, by covalent modification with an internal emulsifier comprising anionic, cationic, or nonionic groups.

Polyether urethane type water-dispersible polyisocyanates may be formed, for example, from a reaction between polyisocyanates and less than stoichiometric amounts of monohydric polyalkylene oxide polyether alcohols. The preparation of such hydrophilically-modified polyisocyanates is described, for example, in U.S. Pat. No. 5,252,696, which is incorporated by reference herein. Polyether allophanate type water-dispersible polyisocyanates may be formed, for example, from a reaction between a polyalkylene oxide polyether alcohol and two polyisocyanate molecules under allophanation conditions. The preparation of such hydrophilically-modified polyisocyanates is described, for example, in U.S. Pat. No. 6,426,414, which is incorporated by reference herein. The polyalkylene oxide polyether alcohol used to prepare polyether type hydrophilically-modified water-dispersible polyisocyanates may comprise, for example, polyethylene oxide residues and/or polypropylene oxide residues.

Polyisocyanates may also be covalently modified with ionic or potentially ionic internal emulsifying groups to form hydrophilically-modified water-dispersible polyisocyanates. The ionic or potentially ionic groups may be cationic or anionic. As used herein, the term "ionic or potentially ionic group" refers to a chemical group that is nonionic under certain conditions and ionic under certain other conditions. For example, in various embodiments, the ionic group or potentially ionic group may comprise a carboxylic acid group; a carboxylate group; a sulfonic acid group; a sulfonate group; a phosphonic acid group; a phosphonate group; or combinations of any thereof. In this regard, for example, carboxylic acid groups, sulfonic acid groups, and phosphonic acid groups are potentially ionic groups, whereas, carboxylate groups, sulfonate groups, and phosphonate groups are ionic groups in the form of a salt, such as, for example, a sodium salt.

For example, carboxylate (carboxylic acid) groups, sulfonate (sulfonic acid) groups, or phosphonate (phosphonic acid) groups may be covalently introduced into polyisocyanates to form hydrophilically-modified water-dispersible polyisocyanates. The ionic or potentially ionic groups may be introduced through a reaction between the isocyanate groups of the polyisocyanate and less than stoichiometric amounts of amino-functional or hydroxy-functional carboxylic acids, sulfonic acids, phosphonic acids, or salts thereof. Examples include, but are not limited to dimethylolpropionic acid (DMPA), N-(2-aminoethyl)-2-aminoethane sulfonic acid (AAS); N-(2-aminoethyl)-2-aminopropionic acid; 2-(cyclohexyl-amino)-ethane sulfonic acid; 3-(cyclohexyl-amino)-1-propane sulfonic acid (CAPS); 2-aminoethylphosphonic acid; or the salts thereof.

If free carboxylic acids, sulfonic acids, or phosphonic acids are incorporated in the polyisocyanate, then the acids may be neutralized with a neutralizing agent, such as, for example, tertiary amines, including, but not limited to, trialkyl-substituted tertiary amines. The preparation of hydrophilically-modified water-dispersible polyisocyanates is described, for example, in U.S. Pat. No. 6,767,958, which is incorporated by reference herein. Water-dispersible polyisocyanate mixtures based on triisocyanatononane (TIN) are described in International Patent Application Publication No. WO-01/62819, which is incorporated by reference herein The NCO content of nonionic type hydrophilically-modified water-dispersible polyisocyanates may be from 5 to 25 weight percent of the polyisocyanate molecule. The NCO content of ionic type hydrophilically-modified water-dispersible polyisocyanates may be from 4 to 26 weight percent of the polyisocyanate molecule.

The polyisocyanates may also be partially blocked with compounds that are reversibly reactive with isocyanate groups. Suitable blocking agents for polyisocyanates include, for example, monohydric alcohols such as methanol, ethanol, butanol, hexanol, cyclohexanol, benzyl alcohol, oximes such as acetoxime, methyl ethyl ketoxime, cyclohexanone oxime, lactams such as .epsilon.-caprolactam, phenols, amines such as diisopropylamine or dibutylamine, dimethylpyrazole or triazole, as well as malonic acid dimethyl ester, malonic acid diethyl ester or malonic acid dibutyl ester.

In addition to the dispersion, the coating composition may include any desired additives or auxiliaries. Suitable additives and auxiliaries include, but are not limited to, fillers, wetting agents, thickeners, fungicides, surfactants, and colorants.

Although primarily exemplified herein in connection with polyurethane dispersions and blends containing polyurethane dispersions, the invention is not intended to be so limited. The present invention encompasses acrylate dispersions and styrene butadiene rubber ("SBR") latex dispersions as the resin-containing dispersion, either alone or in combination with one or more polyurethane dispersions.

It should be noted that the invention is not meant to have an impact on well productivity. It is primarily aimed at preventing dust from being generated during handling and transport of proppants such as sand.

EXAMPLES

The non-limiting and non-exhaustive examples that follow are intended to further describe various non-limiting and non-exhaustive embodiments without restricting the scope of the embodiments described in this specification. All quantities given in "parts" and "percents" are understood to be by weight, unless otherwise indicated. The following materials were used in the Examples described herein:

SURFACTANT—a silicone surfactant for aqueous coatings commercially available as BYK 346 from BYK-Chemie GmbH;

RESIN A—an anionic dispersion of an aliphatic polyester urethane resin in water/n-methyl-2-pyrrolidone commercially available as BAYHYDROL 110 from Bayer MaterialScience;

RESIN B—a core-shell styrene acrylate dispersion commercially available as BAYHYDROL AH XP 2797 from Bayer MaterialScience;

RESIN C—an aqueous styrene acrylate dispersion commercially available as BAYHYDROL AH XP 2754 from Bayer MaterialScience;

RESIN D—an aqueous self-crosslinking polyacrylate dispersion commercially available as BAYHYDROL AH XP 2814 from Bayer MaterialScience;

RESIN E—an aqueous core-shell styrene acrylate dispersion commercially available as BAYHYDROL AH XP 2741 from Bayer MaterialScience;

RESIN F—an anionic aromatic urethane acrylic copolymer dispersion commercially available from DSM as NEOPAC E-106;

RESIN G—a self-crosslinking acrylic dispersion commercially available as AC 2360 from Alberdingk Boley, Inc.;

RESIN H—an acrylic polymer commercially available as RHOPLEX EC-1791 from Dow Chemical Company;

RESIN I—an anionic dispersion of an aliphatic polyester urethane resin in water/toluene commercially available as BAYHYDROL 140 AQ from Bayer MaterialScience;

RESIN J—an aqueous colloidal dispersion of a polymer of 2-chloro-butadiene commercially available as DISPERCOL C84 from Bayer MaterialScience;

Several resin-containing dispersions were evaluated including polyurethane, polyacrylate, and a styrene butadiene rubber ("SBR") latex. Using very low levels of a polyurethane dispersion coating (0.2% solid coating on sand solids) a greater than 90% reduction in dust was observed. The sand was coated and allowed to dry as unconsolidated particles. A quantity of coated, loose sand was then placed in a jar with a quantity of water and agitated to allow the water to remove any dust from the sand particles. The dust was visible as turbidity in the water. A turbidity reading was made of the water to assess the effectiveness of the coating. Although many coatings showed a small improvement in turbidity, the polyurethane dispersions were especially effective even against additional agitation in an "abuse" type simulation. Critical to the effectiveness of the coating is the use of a wetting agent (SURFACTANT) in the formula. This wetting agent allowed the present inventors to minimize the coating thickness and promoted uniformity of the coating on the particle.

Examples 0-7

TABLE I summarizes the results of hot glass plate pre-screening tests using the above-detailed materials. For each RESIN above, a one percent SURFACTANT solution was prepared by combining 20 g RESIN solution+0.2 g SURFACTANT. The glass plate was heated in oven to 122° C. and the materials were dropped onto the glass (at an angle). The flow of the materials was observed. Example 0 was a control. As can be appreciated by reference to FIGS. 1-4, Examples 1, 2, 3 and 4 exhibited cracking and were eliminated from further testing. Examples 5, 6 and 7 exhibited good flow and were tested further. The surface of Example 7 was sticky after overnight drying so the formulation may cause problems when applied to sand.

TABLE I

| Ex. No. | RESIN | % solid | 10% solution with 1% SURFACTANT (on neat resin) |
|---|---|---|---|
| 0 | A | 35 | 100 g A + 1 g SURFACTANT + 250 g DI water |
| 1 | B | 43 | 100 g B + 1 g SURFACTANT + 330 g DI water |
| 2 | C | 40 | 100 g C + 1 g SURFACTANT + 300 g DI water |
| 3 | D | 45.5 | 100 g D + 1 g SURFACTANT + 355 g DI water |
| 4 | E | 40 | 100 g E + 1 g SURFACTANT + 300 g DI water |
| 5 | F | 33 | 100 g F + 1 g SURFACTANT + 230 g DI water |
| 6 | G | 47 | 100 g G + 1 g SURFACTANT + 370 g DI water |
| 7 | H | 55 | 100 g H + 1 g SURFACTANT + 450 g DI water |

Figure 5:
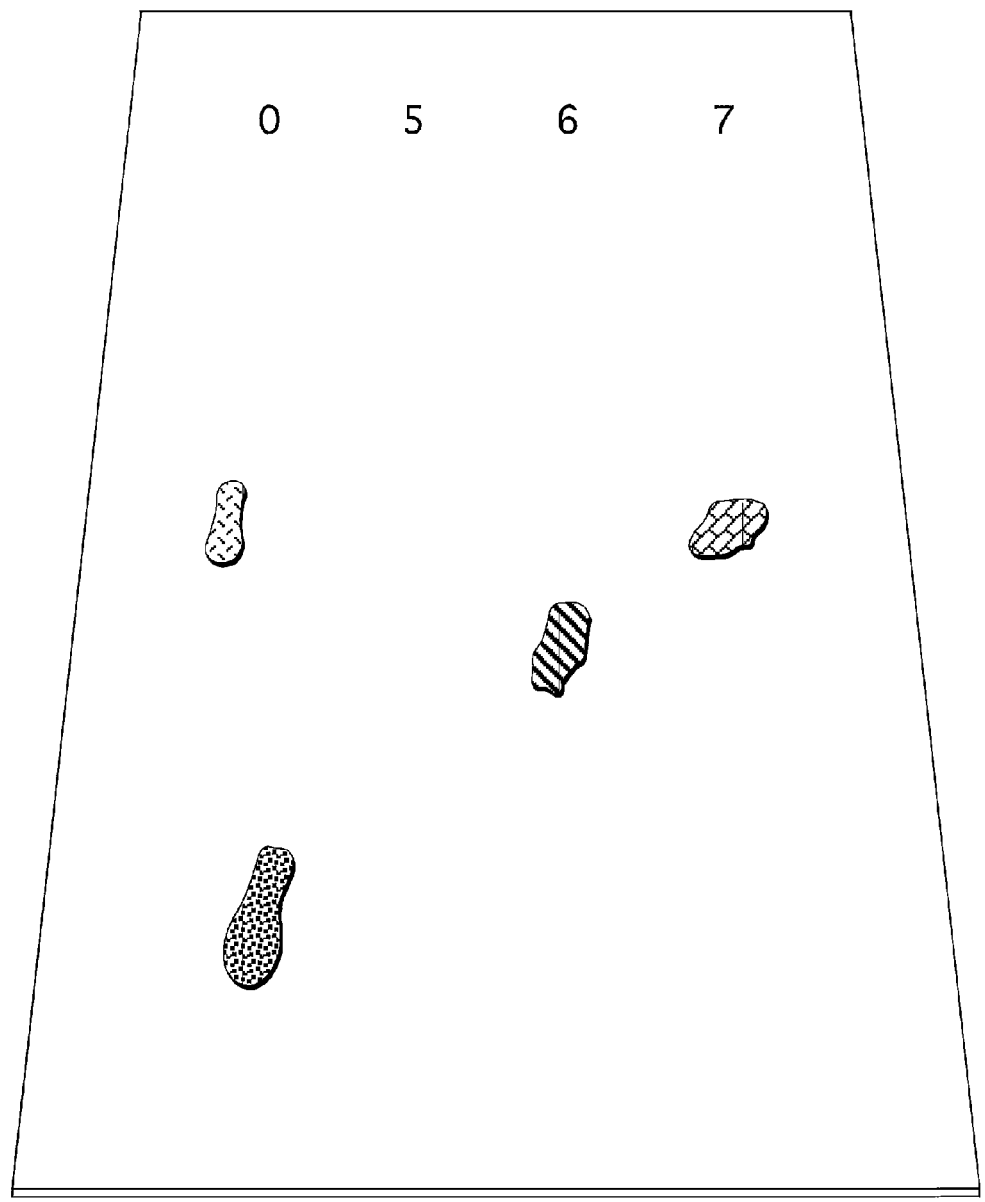
FIG. 5 shows 10% solid resin solutions+1% Surfactant (on neat resin) samples of the successful candidate resin-containing dispersions from FIGS. 1-4.

A subsequent test was conducted on the promising resin-containing dispersion candidates from the pre-screening test. 10% solid RESIN solutions+1% SURFACTANT (on neat resin) with the results depicted in FIG. 5. As can be appreciated by reference to FIG. 5, RESINS 0, 5, 6, 7 all showed good flow; with RESIN 5 having the best result.

The RESINS were used to coat sand particles and the resultant materials were assessed for dust reduction by measuring turbidity of water solutions containing the coated sand particles after being agitated. The 10% solutions of each RESIN were prepared according to TABLE II below.

TABLE II

| RESIN | % solid | 10% solution with 1% SURFACTANT (on neat resin) |
|---|---|---|
| A | 35 | 100 g A + 1 g SURFACTANT + 250 g DI water |
| B | 43 | 100 g B + 1 g SURFACTANT + 330 g DI water |
| C | 40 | 100 g C + 1 g SURFACTANT + 300 g DI water |
| D | 45.5 | 100 g D + 1 g SURFACTANT + 355 g DI water |
| E | 40 | 100 g E + 1 g SURFACTANT + 300 g DI water |
| F | 33 | 100 g F + 1 g SURFACTANT + 230 g DI water |
| G | 47 | 100 g G + 1 g SURFACTANT + 370 g DI water |
| H | 55 | 100 g H + 1 g SURFACTANT + 450 g DI water |
| I | 40 | 100 g I + 1 g SURFACTANT + 300 g DI water |
| J | 55 | 100 g J + 1 g SURFACTANT + 450 g DI water |

Fresh, bare sand and fresh, bare sand coated with RESIN A were measured as controls for dust reduction as follows:

1. 500 g bare sand (ASTM 20/40 mesh from Carbo Ceramics) was weighed in mixing bowl and heated to 122° C. in an oven.

2. 10 g of the 10% solid solution of RESIN A was added under agitation in a mixer (KITCHENAID) until the sand cooled (approximately 6-8 minutes). Note: the sand was quickly mixed for 10 sec., the agitation stopped, the mix head lifted, the solution poured in, the mix head was put down and the mixture was agitated at a 4-6 setting).

3. The resulting material was allowed to cool further for about 5 min and 50 g of the material was mixed with 50 g tap water. The resultant materials were spin mixed for 10 sec.

4. The water was transferred into a glass vial and the turbidity measured using a turbidimeter for a turbidity rating in NTU units according to ASTM D7726.

Figure 6:
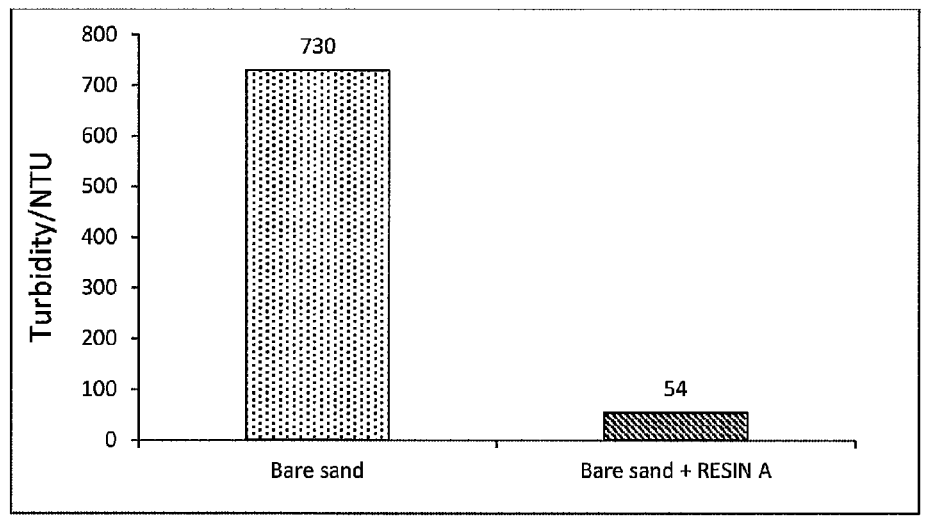
FIG. 6 shows a comparison of the turbidity measurements of water from bare sand and from sand coated with a resin-containing dispersion.

Water from bare sand had a turbidity of 730 NTU whereas water from the bare sand+RESIN A solution had a turbidity of 54 NTU. Thus, coating the sand with RESIN A resulted in a greater than 90% reduction in dust. These results are graphically presented in FIG. 6.

Figure 7:
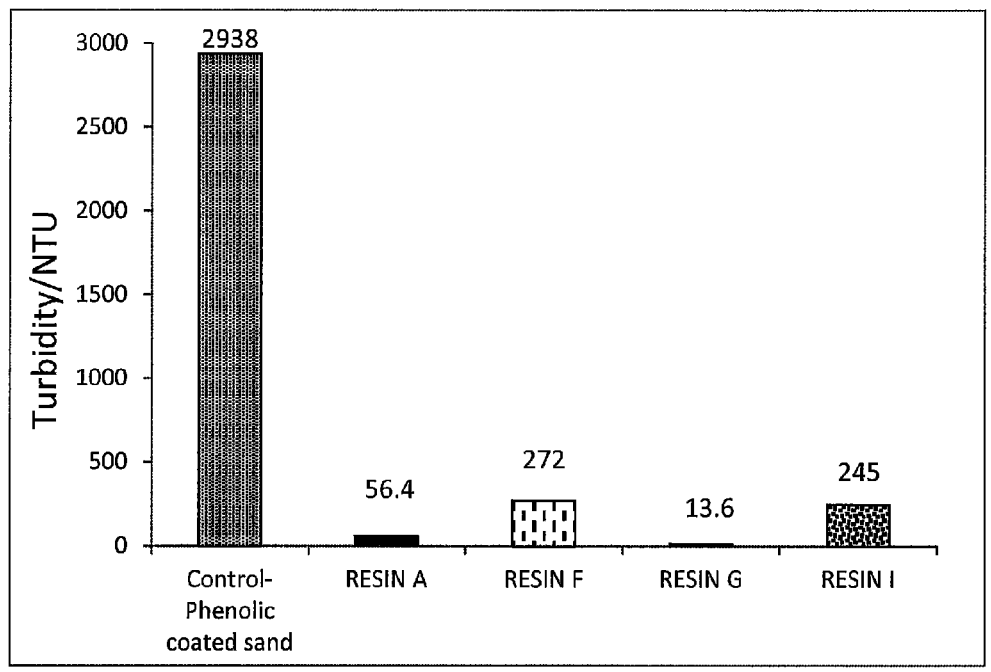
FIG. 7 shows a comparison of dust reduction for several resin-containing dispersion coatings based on turbidity measurements.

The process described above was repeated except precoated sand (phenolic resin coated sand from Carbo Ceramics) was further coated with the RESINS noted below in TABLE III. Turbidity measurements are given below and the data is presented graphically in FIG. 7.

TABLE III

| Ex. No. | RESIN | Turbidity (NTU) |
|---|---|---|
| 8 | Control (phenolic resin) | 2938 |
| 9 | RESIN A | 56.4 |
| 10 | RESIN F | 272 |
| 11 | RESIN G | 13.6 |
| 12 | RESIN I | 245 |

Figure 8:
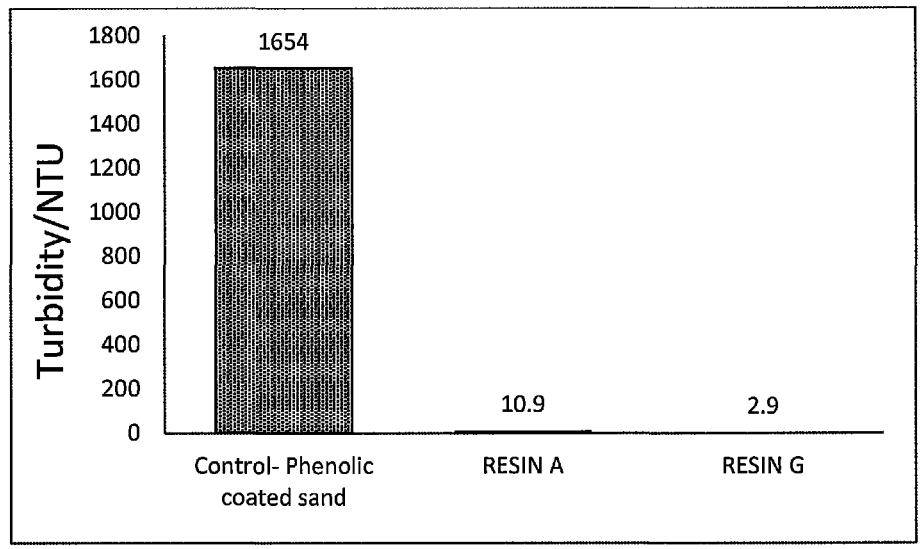
FIG. 8 shows a comparison of dust reduction for several resin-containing dispersion coatings based on turbidity measurements using a shaker.

A shaker test was conducted on pre-coated sand (phenolic resin coated sand from Carbo Ceramics) further coated with the RESINS A or G as follows. Briefly, 200 g of each sand sample was placed in a quart metal paint can and shaken for 30 min. on a paint shaker. The turbidity of the water was measured, as before, using a turbidimeter for a turbidity rating in NTU units according to ASTM D7726. The control (phenolic resin coated sand) water had a turbidity of 1654 NTU; water from the RESIN A coated sand had a turbidity of 10.9 NTU; and water from the RESIN G coated sand had a turbidity of 2.9 NTU. These data are presented graphically in FIG. 8.

Figure 9:
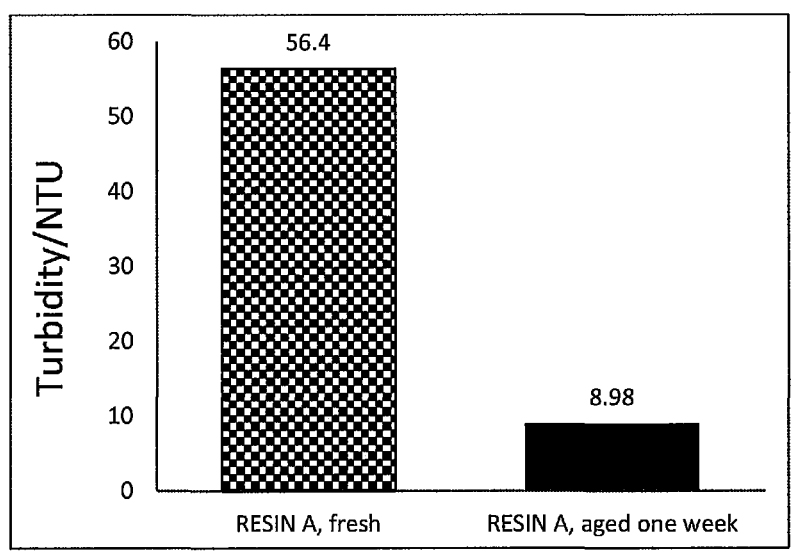
FIG. 9 shows a comparison of dust reduction based on turbidity measurements for a fresh sample of dispersion and a one week aged sample of resin-containing dispersion.

A second shaker test (as described in in the preceding paragraph) was conducted to determine the effect of ageing of RESIN A on pre-coated sand (phenolic resin coated sand from Carbo Ceramics). The turbidity of water from fresh sample of RESIN A-coated sand and water from a sample of sand coated with RESIN A which had been aged for one week were both measured as described above. Water from the fresh sample of RESIN A-coated sand had a turbidity of 56.4 NTU, whereas that from a one week aged sample of RESIN A had a turbidity of 8.98 NTU. These results are graphically shown in FIG. 9.

Figure 10:
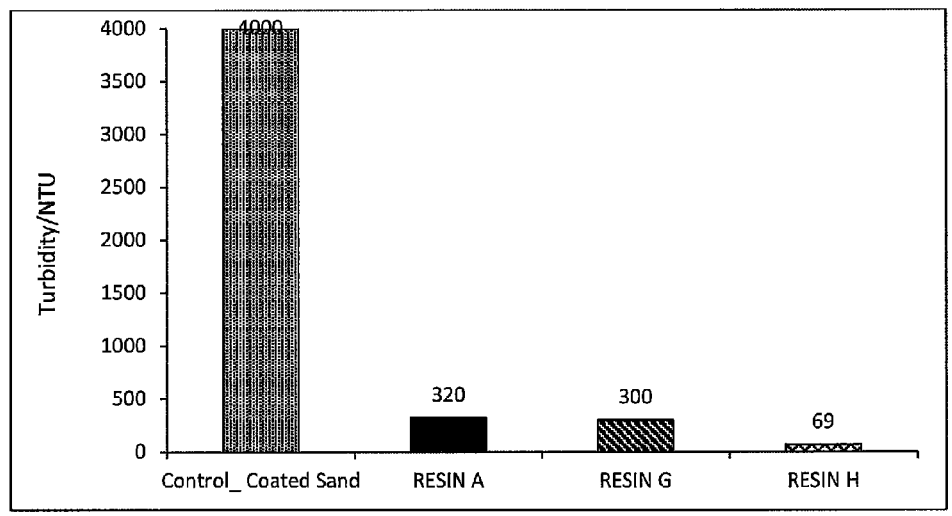
FIG. 10 shows a comparison based on turbidity measurements several resin-containing dispersions on sand aged for approximately six months.

The process described above was repeated except approximately six month old coated sand (phenolic resin coated sand from Carbo Ceramics) further coated with the RESINS noted below in TABLE IV were used. The turbidity measurements were made as described elsewhere herein and are given below in TABLE IV with the data presented graphically in FIG. 10. Both RESIN A and RESIN G coated sand showed a greater than 90% reduction in dust. The sand coated with RESIN H had a clumpy appearance.

TABLE IV

| Sample | Turbidity (NTU) |
|---|---|
| Control Coated Sand | 4000 |
| RESIN A | 320 |
| RESIN G | 300 |
| RESIN H | 69 |

Figure 11:
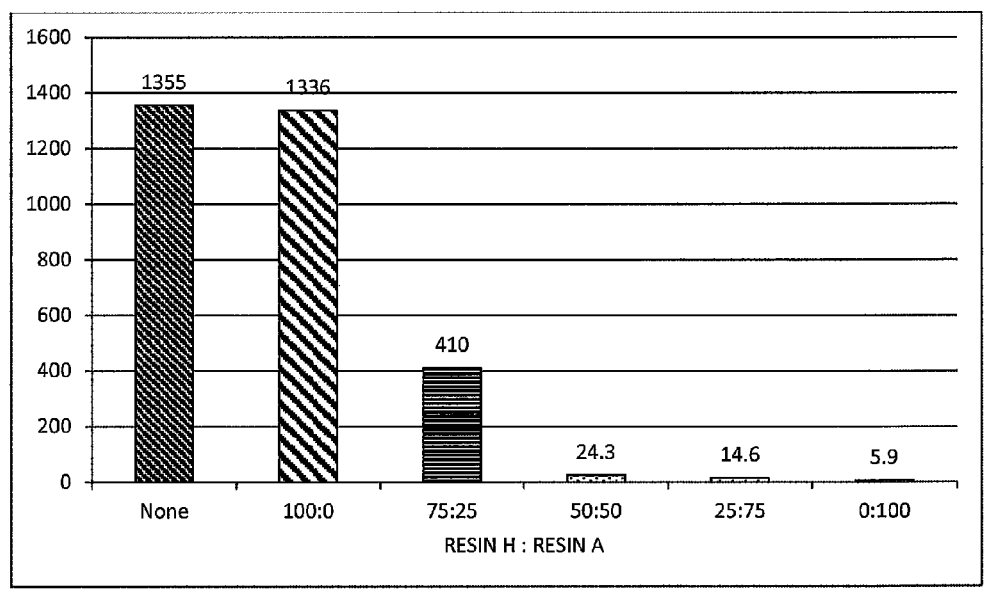
FIG. 11 shows a comparison of dust reduction based on turbidity measurements for various ratios of resin-containing dispersion coatings made from a blend of an acrylic dispersion and a polyurethane dispersion.

The process described above was repeated except 40/70 mesh sand (exceptionally dusty—the sand not fully processed to render it "clean") was coated with the blends of RESINS H and A noted below in TABLE V. The turbidity measurements were made as described herein and are given below in TABLE V with the data presented graphically in FIG. 11. As can be appreciated by reference to FIG. 11, an acceptable level of dust reduction occurred with a 50:50 blend of two resin-containing dispersions.

TABLE V

| SAMPLE | RESIN H:RESIN A | Turbidity (NTU) |
|---|---|---|
| None | None | 1355 |
| RESIN H 100% | 100:0 | 1336 |
| RESIN H 75% + RESIN A 25% | 75:25 | 410 |
| RESIN H 50% + RESIN A 50% | 50:50 | 24.3 |
| RESIN H 25% + RESIN A 75% | 25:75 | 14.6 |
| RESIN A 100% | 0:100 | 5.9 |

Figure 12:
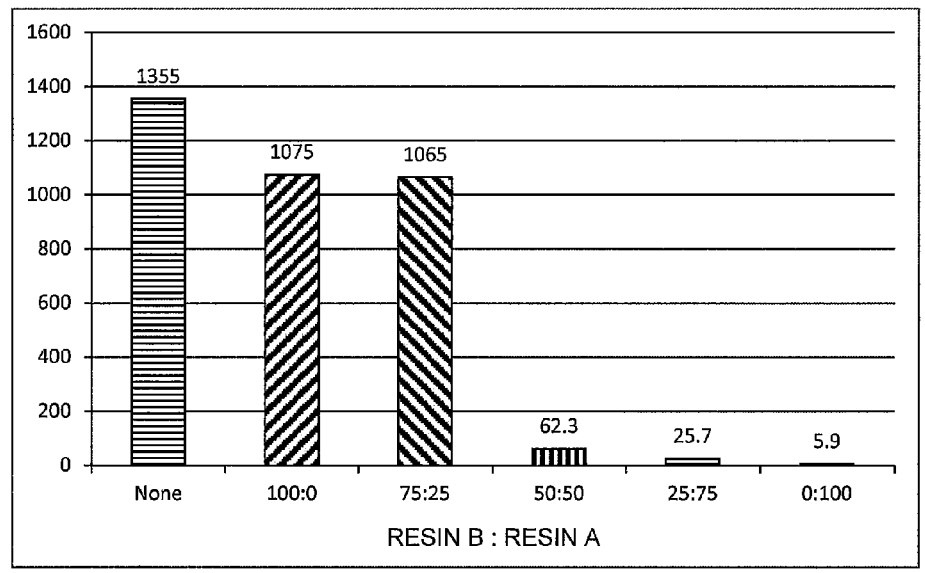
FIG. 12 shows a comparison of dust reduction based on turbidity measurements for various ratios of resin-containing dispersion coatings made from a blend of another acrylic dispersion and the same polyurethane dispersion as depicted in FIG. 11.

The process described above was repeated except 40/70 sand (exceptionally dusty as in the previous examples) was coated with the blends of RESINS B and A noted below in TABLE VI. The turbidity measurements were made as described herein and are given below in TABLE VI with the data presented graphically in FIG. 12. As can be appreciated by reference to FIG. 12, an acceptable level of dust reduction was achieved with a 50:50 blend.

TABLE VI

| SAMPLE | RESIN B:RESIN A | Turbidity (NTU) |
|---|---|---|
| None | None | 1355 |
| RESIN B 100% | 100:0 | 1075 |
| RESIN B 75% + RESIN A 25% | 75:25 | 1065 |
| RESIN B 50% + RESIN A 50% | 50:50 | 62.3 |
| RESIN B 25% + RESIN A 75% | 25:75 | 25.7 |
| RESIN A 100% | 0:100 | 5.9 |

Figure 13:
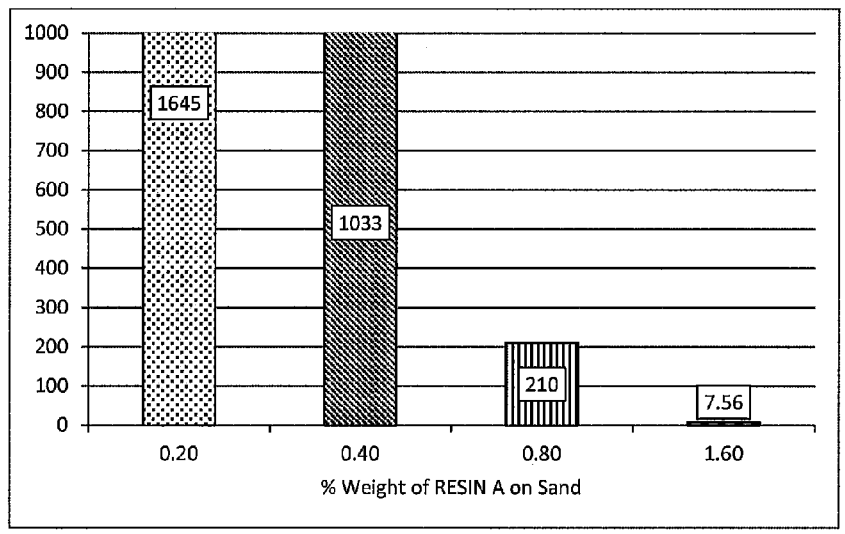
FIG. 13 shows a comparison of coated sand abuse based on turbidity measurements at various concentrations of a polyurethane dispersion.

FIG. 13 shows a comparison of coated sand abuse based on turbidity measurements at various concentrations of polyurethane dispersion (RESIN A). The shaker test described above was repeated with 40/70 mesh sand (exceptionally dusty as in the previous examples) coated with the percent weight of RESIN A specified in TABLE VII. The turbidity of the water was measured, as before, using a turbidimeter for a turbidity rating in NTU units according to ASTM D7726.

TABLE VII

| % weight RESIN A | Turbidity (NTU) |
|---|---|
| 0.20 | 1645 |
| 0.40 | 1033 |
| 0.80 | 210 |
| 1.60 | 7.56 |

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

1. A coated proppant comprising: a core; and a resin-containing dispersion coating surrounding the core, wherein the coated proppant has at least about a 90% reduction in dust as compared to a comparable core in an uncoated state.

2. The coated proppant according to clause 1, wherein the core comprises one selected from the group consisting of sand, mineral fiber, a ceramic particle, a bauxite particle, a glass particle, a metal bead, a walnut hull, a composite particle and coated sand.

3. The coated proppant according to one of clauses 1 and 2, wherein the resin-containing dispersion is applied at about 0.05 wt. % to about 2.0 wt. % resin solids based on the weight of the proppant.

4. The coated proppant according to any one of clauses 1 to 3, wherein the resin-containing dispersion comprises the reaction product of an isocyanate and an isocyanate reactive compound.

5. The coated proppant according to clause 4, wherein the isocyanate is one selected from the group consisting of aliphatic or cycloaliphatic diisocyanates, aromatic diisocyanates and triisocyanates.

6. The coated proppant according to clause 4, wherein the isocyanate is selected from the group consisting of ethylene diisocyanate, 1,4-tetramethylene diisocyanate, 1,6-hexamethylene diisocyanate (HDI), 2,2,4-trimethyl-1,6-hexamethylene diisocyanate, 1,12-dodecamethylene diisocyanate, 1-isocyanato-3-isocyanatomethyl-3,5,5-trimethyl-cyclohexane (isophorone diisocyanate or IPDI), bis-(4-isocyanatocyclohexyl)methane ($H_{12}$MDI), cyclohexane 1,4-diisocyanate, bis-(4-isocyanato-3-methyl-cyclohexyl)methane, pentane diisocyanate (PDI), benzene diisocyanate, toluene diisocyanate (TDI), diphenylmethane diisocyanate (MDI) and 4-isocyanatomethyl-1,8-octane diisocyanate (triisocyanatononane or TIN).

7. The coated proppant according to any one of clauses 1 to 6, wherein the resin-containing dispersion comprises a blend of dispersions.

8. The coated proppant according to clause 7, wherein the blend comprises one or more selected from the group consisting of polyurethane dispersions, polyacrylate dispersions and styrene butadiene rubber ("SBR") latex dispersions.

9. A process for coating a proppant comprising disposing a resin-containing dispersion over at least a portion of a proppant core, wherein the coated proppant has at least about a 90% reduction in dust as compared to a comparable core in an uncoated state.

10. The process according to clause 9, wherein the core comprises one selected from the group consisting of sand, mineral fiber, a ceramic particle, a bauxite particle, a glass particle, a metal bead, a walnut hull, a composite particle and coated sand.

11. The process according to one of clauses 9 and 10, wherein the resin-containing dispersion is applied at about 0.05 wt. % to about 2.0 wt. % resin solids based on the weight of the proppant.

12. The process according to any one of clauses 9 to 11, wherein the resin-containing dispersion comprises the reaction product of an isocyanate and an isocyanate reactive compound.

13. The process according to clause 12, wherein the isocyanate is one selected from the group consisting of aliphatic or cycloaliphatic diisocyanates, aromatic diisocyanates and triisocyanates.

14. The process according to clause 12, wherein the isocyanate is selected from the group consisting of ethylene diisocyanate, 1,4-tetramethylene diisocyanate, 1,6-hexamethylene diisocyanate (HDI), 2,2,4-trimethyl-1,6-hexamethylene diisocyanate, 1,12-dodecamethylene diisocyanate, 1-isocyanato-3-isocyanatomethyl-3,5,5-trimethyl-cyclohexane (isophorone diisocyanate or IPDI), bis-(4-isocyanatocyclohexyl)methane ($H_{12}$MDI), cyclohexane 1,4-diisocyanate, bis-(4-isocyanato-3-methyl-cyclohexyl)methane, pentane diisocyanate (PDI), benzene diisocyanate, toluene diisocyanate (TDI), diphenylmethane diisocyanate (MDI) and 4-isocyanatomethyl-1,8-octane diisocyanate (triisocyanatononane or TIN).

15. The process according to any one of clauses 9 to 14, wherein the resin-containing dispersion comprises a blend of dispersions.

16. The process according to clause 15, wherein the blend comprises one or more selected from the group consisting of polyurethane dispersions, polyacrylate dispersions and styrene butadiene rubber ("SBR") latex dispersions.

17. A process for reducing dust from a proppant comprising disposing a resin-containing dispersion over at least a portion of a proppant core, wherein the coated proppant core has at least about a 90% reduction in dust as compared to a comparable core in an uncoated state.

18. The process according to clause 17, wherein the core comprises one selected from the group consisting of sand, mineral fiber, a ceramic particle, a bauxite particle, a glass particle, a metal bead, a walnut hull, a composite particle and coated sand.

19. The process according to one of clauses 17 and 18, wherein the resin-containing dispersion is applied at about 0.05 wt. % to about 2.0 wt. % resin solids based on the weight of the proppant.

20. The process according to any one of clauses 17 to 19, wherein the resin-containing dispersion comprises the reaction product of an isocyanate and an isocyanate reactive compound.

21. The process according to clause 20, wherein the isocyanate is one selected from the group consisting of aliphatic or cycloaliphatic diisocyanates, aromatic diisocyanates and triisocyanates.

22. The process according to clause 20, wherein the isocyanate is selected from the group consisting of ethylene diisocyanate, 1,4-tetramethylene diisocyanate, 1,6-hexamethylene diisocyanate (HDI), 2,2,4-trimethyl-1,6-hexamethylene diisocyanate, 1,12-dodecamethylene diisocyanate, 1-isocyanato-3-isocyanatomethyl-3,5,5-trimethyl-cyclohexane (isophorone diisocyanate or IPDI), bis-(4-isocyanatocyclohexyl)methane ($H_{12}$MDI), cyclohexane 1,4-diisocyanate, bis-(4-isocyanato-3-methyl-cyclohexyl)methane, pentane diisocyanate (PDI), benzene diisocyanate, toluene diisocyanate (TDI), diphenylmethane diisocyanate (MDI) and 4-isocyanatomethyl-1,8-octane diisocyanate (triisocyanatononane or TN).

23. The process according to any one of clauses 17 to 22, wherein the resin-containing dispersion comprises a blend of dispersions.

24. The process according to any one of clauses 17 to 23, wherein the blend comprises one or more selected from the group consisting of polyurethane dispersions, polyacrylate dispersions and styrene butadiene rubber ("SBR") latex dispersions.

What is claimed is:

1. A coated proppant comprising:
    a core; and
    a polyurethane dispersion coating disposed over at least a portion of the core,
wherein the coated proppant has at least about a 90% reduction in dust from the core as compared to a comparable core in an uncoated state, wherein the polyurethane dispersion coating is applied at about 0.05 wt. % to about 0.2 wt. % resin solids based on the weight of the proppant, and wherein the polyurethane dispersion contains n-methyl-2-pyrrolidone.

2. The coated proppant according to claim 1, wherein the core comprises one selected from the group consisting of sand, mineral fiber, a ceramic particle, a bauxite particle, a glass particle, a metal bead, a walnut hull, a composite particle and coated sand.

3. The coated proppant according to claim 1, wherein the polyurethane dispersion comprises the reaction product of an isocyanate and an isocyanate reactive compound.

4. The coated proppant according to claim 3, wherein the isocyanate is one selected from the group consisting of aliphatic or cycloaliphatic diisocyanates, aromatic diisocyanates and triisocyanates.

5. The coated proppant according to claim 3, wherein the isocyanate is selected from the group consisting of ethylene diisocyanate, 1,4-tetramethylene diisocyanate, 1,6-hexamethylene diisocyanate (HDI), 2,2,4-trimethyl-1,6-hexamethylene diisocyanate, 1,12-dodecamethylene diisocyanate, 1-isocyanato-3-isocyanatomethyl-3,5,5-trimethyl-cyclohexane (isophorone diisocyanate or IPDI), bis-(4-isocyanatocyclohexyl)methane ($H_{12}$MDI), cyclohexane 1,4-diisocyanate, bis-(4-isocyanato-3-methyl-cyclohexyl)methane, pentane diisocyanate (PDI), benzene diisocyanate, toluene diisocyanate (TDI), diphenylmethane diisocyanate (MDI) and 4-isocyanatomethyl-1,8-octane diisocyanate (triisocyanatononane or TIN).

6. A process for coating a proppant comprising:
    disposing a polyurethane dispersion over at least a portion of a proppant core, wherein the coated proppant has at least about a 90% reduction in dust from the core as compared to a comparable core in an uncoated state, wherein the polyurethane dispersion coating is applied at about 0.05 wt. % to about 0.2 wt. % resin solids based on the weight of the proppant, and wherein the polyurethane dispersion contains n-methyl-2-pyrrolidone.

7. The process according to claim 6, wherein the core comprises one selected from the group consisting of sand, mineral fiber, a ceramic particle, a bauxite particle, a glass particle, a metal bead, a walnut hull, a composite particle and coated sand.

8. The process according to claim 6, wherein the polyurethane dispersion comprises the reaction product of an isocyanate and an isocyanate reactive compound.

9. The process according to claim 8, wherein the isocyanate is one selected from the group consisting of aliphatic or cycloaliphatic diisocyanates, aromatic diisocyanates and triisocyanates.

10. The process according to claim 8, wherein the isocyanate is selected from the group consisting of ethylene diisocyanate, 1,4-tetramethylene diisocyanate, 1,6-hexamethylene diisocyanate (HDI), 2,2,4-trimethyl-1,6-hexamethylene diisocyanate, 1,12-dodecamethylene diisocyanate, 1-isocyanato-3-isocyanatomethyl-3,5,5-trimethyl-cyclohexane (isophorone diisocyanate or IPDI), bis-(4-isocyanatocyclohexyl)methane ($H_{12}$MDI), cyclohexane 1,4-diisocyanate, bis-(4-isocyanato-3-methyl-cyclohexyl)methane, pentane diisocyanate (PDI), benzene diisocyanate, toluene diisocyanate (TDI), diphenylmethane diisocyanate (MDI) and 4-isocyanatomethyl-1,8-octane diisocyanate (triisocyanatononane or TIN).

11. A process for reducing dust from a proppant comprising;
    disposing a polyurethane dispersion over at least a portion of a proppant core, wherein the coated proppant core has at least about a 90% reduction in dust from the core as compared to a comparable core in an uncoated state, wherein the polyurethane dispersion coating is applied at about 0.05 wt. % to about 0.2 wt. % resin solids based on the weight of the proppant, and wherein the polyurethane dispersion contains n-methyl-2-pyrrolidone.

12. The process according to claim 11, wherein the core comprises one selected from the group consisting of sand, mineral fiber, a ceramic particle, a bauxite particle, a glass particle, a metal bead, a walnut hull, a composite particle and coated sand.

13. The process according to claim 11, wherein the resin-containing dispersion comprises the reaction product of an isocyanate and an isocyanate reactive compound.

14. The process according to claim 13, wherein the isocyanate is one selected from the group consisting of aliphatic or cycloaliphatic diisocyanates, aromatic diisocyanates and triisocyanates.

15. The process according to claim 13, wherein the isocyanate is selected from the group consisting of ethylene diisocyanate, 1,4-tetramethylene diisocyanate, 1,6-hexamethylene diisocyanate (HDI), 2,2,4-trimethyl-1,6-hexamethylene diisocyanate, 1,12-dodecamethylene diisocyanate, 1-isocyanato-3-isocyanatomethyl-3,5,5-trimethyl-cyclohexane (isophorone diisocyanate or IPDI), bis-(4-isocyanatocyclohexyl)methane ($H_{12}MDI$), cyclohexane 1,4-diisocyanate, bis-(4-isocyanato-3-methyl-cyclohexyl)methane, pentane diisocyanate (PDI), benzene diisocyanate, toluene diisocyanate (TDI), diphenylmethane diisocyanate (MDI) and 4-isocyanatomethyl-1,8-octane diisocyanate (triisocyanatononane or TIN).

* * * * *